No. 659,774.  
J. C. TUCKER.  
ANIMAL AND FOWL WATER TROUGH.  
(Application filed June 23, 1899. Renewed Mar. 1, 1900.)  
Patented Oct. 16, 1900.  
(No Model.)
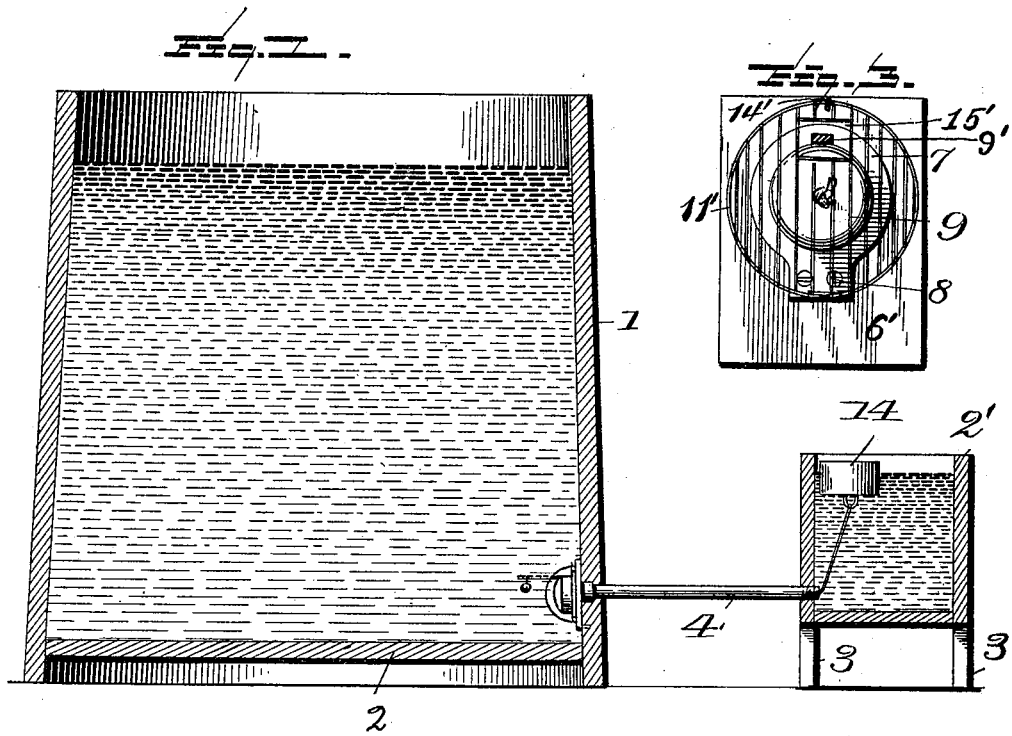
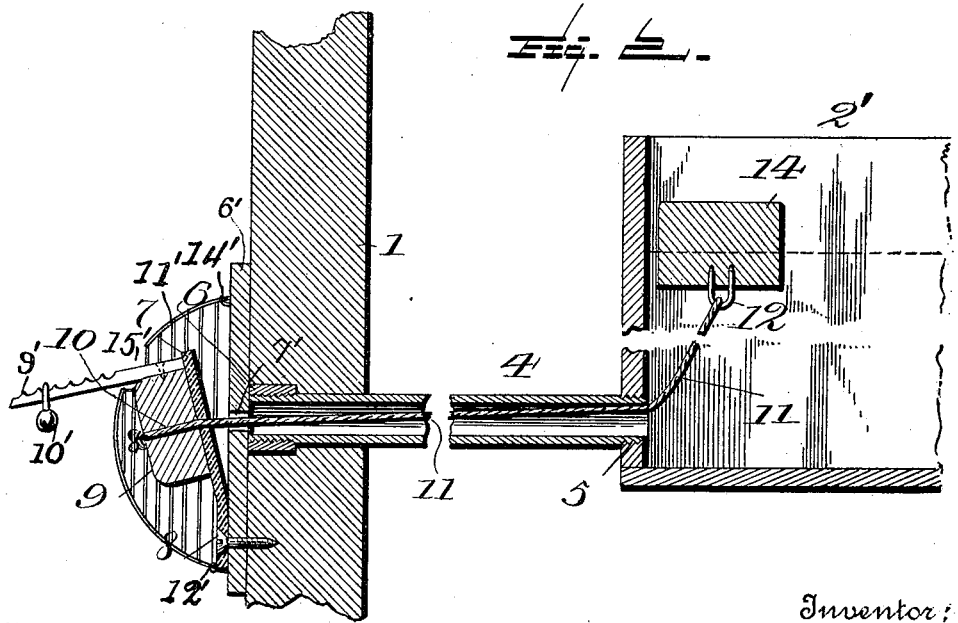
Witnesses  
L. C. Hills  
N. L. Bogan
Inventor:  
James C. Tucker,  
By N. C. Evert & Co.  
Attorneys

UNITED STATES PATENT OFFICE.

JAMES C. TUCKER, OF NEAR SMITH CENTRE, KANSAS.

ANIMAL AND FOWL WATER-TROUGH.

SPECIFICATION forming part of Letters Patent No. 659,774, dated October 16, 1900.

Application filed June 23, 1899. Renewed March 1, 1900. Serial No. 7,019. (No model.)

*To all whom it may concern:*

Be it known that I, JAMES C. TUCKER, a citizen of the United States, residing near Smith Centre, in the county of Smith and State of Kansas, have invented certain new and useful Improvements in Animal and Fowl Water-Troughs; and I do hereby declare the following to be a full, clear, and exact description of the invention, such as will enable others skilled in the art to which it appertains to make and use the same.

This invention relates to certain new and useful improvements in animal and fowl water-troughs, and has for its object to provide, in connection with a water-supply tank, a trough having a pipe connection with the tank and a flap-valve arranged within the tank and controlled by a float in the trough to admit an additional supply of water to the trough as the supply therein is used.

In describing the invention in detail reference will be had to the accompanying drawings, forming a part of this invention, and wherein like numerals of reference will be used to indicate similar parts throughout the several views of the drawings, in which—

Figure 1 is a vertical sectional view of a water-supply tank and the trough, showing the valve closed. Fig. 2 is a sectional view of a part of the tank and trough, showing the pipe connection, also in section, and the flap-valve open, so as to admit water to the trough. Fig. 3 is a plan view of the flap-valve.

Referring now to the drawings by reference-numerals, 1 indicates the supply-tank, which may be of any desirable style and size, having its bottom 2 a slight distance from the lower end of the wall in order that the same will not rest upon the ground in case the tank is so situated. At a suitable distance from this supply-tank I place the watering-trough 2', which may be suitably supported, as at 3, and is supplied with water from the tank by means of the tube or pipe 4. This tube or pipe is preferably threaded into the wall of the trough, as at 5, and at the end engaging in the wall of the tank is exteriorly screw-threaded to receive the collar or sleeve 6, which fits in the enlarged portion of the aperture receiving the tube or pipe, and thus holds the latter firmly in the wall of the tank to prevent its withdrawal. Secured to the inner face of the tank over the inlet of the tube or pipe 4 is a plate 6', having an opening 7' of less diameter and registering with the bore of the tube or pipe.

The inlet from the tank to the trough is closed by means of a flap-valve 7, preferably composed of rubber, leather, or like material, secured, as at 8, to the plate 6' and the inner face of the tank at a point below the outlet from the tank and has secured to its outer face at a point opposite the outlet a block or weight 9, which, together with the flap, is apertured, as at 10, to receive the flexible wire or cable 11. This wire or cable is knotted or secured to the outer face of the block or weight to prevent its withdrawal and extends through the outlet tube or pipe 4 into the trough 2', where its other end is affixed to a staple or eye 12, carried by the float 14 in the trough. To assist in opening this flap-valve, I attach to the upper face of the weight or block 9 a notched bar or beam 9', adapted to receive a weight 10', which serves to open the valve as the float 14 descends in the trough, the combined weight of which parts is, however, less than that of the float.

To prevent the clogging of the valve through straws or other foreign matter in the tank, I provide a screen-cup 11', which surrounds the valve and is hinged at its lower side, as at 12', to the plate 6' and at its upper side is hooked, as at 14', to the said plate. This screen-cup is provided with an opening 15', to permit the operation of the notched bar or beam carrying the weight, and by hinging the same access may readily be had to the valve to repair same when the tank is empty.

The operation of the device is as follows: The tank 1 is filled with the supply of water, and assuming the watering-trough 2 to be empty the float 14 will be resting upon the bottom of said trough, and the weight or block 9, together with the weight 10', will have caused the flap-valve to open in the position shown in Fig. 2 of the drawings, so as to admit the water from the supply-tank to the trough. As this trough fills with water the float 14 is carried upward thereby, and by reason of its being heavier than the weight 9 and weight 10' draws the flap 7 against the plate 6', sealing the inlet to the tube or pipe 4 and checking the flow of water to the trough. As the water is consumed from the trough the float 14 recedes therewith, and the wire or cable 11 being slackened the weights 9 and 10' withdraw the flap 7 from its sealing engagement over the inlet of the tube or pipe 4 and allows the water to again flow into the trough until such time as the float draws the flap 7 into sealing engagement and checks the flow, as afore described.

It will be noticed that various changes may be made in the details of construction without departing from the general spirit of my invention.

Having fully described my invention, what I claim as new, and desire to secure by Letters Patent, is—

1. In an animal and fowl water-trough, the combination with a supply-tank and a watering-trough, of a pipe or tube communicating with said tank and trough, a sleeve or collar secured to the end of the pipe or tube engaging the tank, a plate secured to the inner face of the tank adjacent the end of the tube or pipe and provided with an aperture of less diameter than the opening in the tube or pipe, a flap-valve secured to said plate, a block attached to the outer face of said flap-valve, a cord or cable connected to said block and extending through the pipe or tube into the trough, a float within the said trough to which said cord or cable is attached, and a hinged screen-cup surrounding said flap-valve within the tank, substantially as described.

2. In an animal and fowl water-trough, a supply-tank, a watering-trough, a pipe or tube communicating with said tank and trough, and a plate secured to the inner face of the tank and provided with an aperture registering with the opening in the tube, combined with a flap-valve secured to said plate, a block secured to the outer face of said flap-valve, a float within the trough, a screen-cup arranged around the flap-valve, a notched beam or bar connected to said block, a weight carried by said beam or bar, and a flexible wire or cable connecting said block with the float whereby the flap-valve is drawn into sealing engagement with the plate by the rising of the float within the trough, substantially as described.

3. In an animal and fowl water-trough, the combination with a supply-tank and a watering-trough, of a pipe or tube communicating with said tank and trough, a flap-valve connected to the inner face of the tank and adapted to seal the inlet to said tube or pipe, a float within the trough, a flexible wire or cable connecting said float and flap-valve, a notched bar or beam carrying a weight attached to said flap-valve to assist in opening the same, and a hinged screen-cup surrounding said flap-valve, substantially as described.

In testimony whereof I affix my signature in presence of two witnesses.

JAMES C. TUCKER.

Witnesses:
DAVID F. CARL,
CHAS. S. UHL.